(12) United States Patent
Shibukawa et al.

(10) Patent No.: US 8,833,497 B2
(45) Date of Patent: Sep. 16, 2014

(54) TRAVEL DRIVE DEVICE FOR DUMP TRUCK (75) Inventors: Takeshi Shibukawa, Abiko (JP);
Naoyuki Inoue, Tsuchiura (JP); Kyoko Tanaka, Namegata (JP); Shinichiro Hagihara, Tsuchiura (JP); Takeshi Shinohara, Omitama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 123 days.

(21) Appl. No.: 13/544,202

(22) Filed: Jul. 9, 2012

(65) Prior Publication Data

US 2013/0056289 A1 Mar. 7, 2013

(30) Foreign Application Priority Data

Sep. 6, 2011 (JP) ................................. 2011-193696

(51) Int. Cl.
*B60K 7/00* (2006.01)
*F16H 57/04* (2010.01)
*F16D 55/40* (2006.01)
*F16D 65/853* (2006.01)
*B60K 17/04* (2006.01)
*F16D 65/00* (2006.01)

(52) U.S. Cl.
CPC .............. *B60K 17/046* (2013.01); *F16D 55/40* (2013.01); *F16D 65/0031* (2013.01); *F16D 65/853* (2013.01)
USPC ......................................... 180/65.6; 475/159

(58) Field of Classification Search
USPC ............. 180/65.51, 65.6, 65.7; 475/149, 150, 475/159, 160; 74/467; 184/6
See application file for complete search history.

(56) References Cited

U.S. PATENT DOCUMENTS

| | | | | |
|---|---|---|---|---|
| 3,770,074 A | * | 11/1973 | Sherman | 180/65.6 |
| 3,892,300 A | * | 7/1975 | Hapeman et al. | 180/65.51 |
| 3,897,843 A | * | 8/1975 | Hapeman et al. | 180/65.51 |
| 4,330,045 A | * | 5/1982 | Myers | 180/65.51 |
| 8,062,160 B2 | * | 11/2011 | Shibukawa | 475/150 |
| 8,100,806 B2 | * | 1/2012 | Shibukawa et al. | 475/159 |
| 2009/0215569 A1 | | 8/2009 | Shibukawa et al. | |

FOREIGN PATENT DOCUMENTS

| | | |
|---|---|---|
| DE | 1817100 A1 | 7/1970 |
| DE | 10217483 A1 | 11/2003 |
| GB | 2109880 A | 6/1983 |
| JP | 55-34517 U | 3/1980 |
| JP | 2009-204016 A | 9/2009 |
| JP | 2009-210043 A | 9/2009 |
| JP | 2010-116963 A | 5/2010 |
| WO | 90/05079 A1 | 5/1990 |

* cited by examiner

*Primary Examiner* — Frank Vanaman
(74) *Attorney, Agent, or Firm* — Mattingly & Malur, PC (57) ABSTRACT A wheel mounting cylinder (18) is rotatably provided on an outer peripheral side of an axle housing (12) through wheel support bearings (20, 21). A wet brake (45) is provided between the axle housing (12) and the wheel mounting cylinder (18) for applying a braking force to rotation of the wheel mounting cylinder (18). A seal mechanism (55) is provided between the wet brake (45) and the wheel support bearing (20) for keeping a cooling liquid (50) of the wet brake (45) in a sealed state to lubricant oil (100) in the wheel mounting cylinder (18). A foreign-object trapping portion (58, 62) is provided between the wheel support bearing (20) and the seal mechanism (55) for trapping foreign objects flowing from the seal mechanism (55) toward the wheel support bearing (20).

4 Claims, 6 Drawing Sheets

TRAVEL DRIVE DEVICE FOR DUMP TRUCK

TECHNICAL FIELD

The present invention relates to a travel drive device for a dump truck which is suitably used in transporting crushed stones excavated from such as an open-pit stope, a stone quarry, a mine or the like.

BACKGROUND ART

In general, a large-sized transporter vehicle called a dump truck has a liftable vessel (loading platform) on a frame of a vehicle body, and transports crushed stones or the like in a state of a heavy baggage being loaded in a large quantity on the vessel.

Therefore, each travel drive device for driving drive wheels of the dump truck for traveling is provided with a cylindrical axle housing mounted in a non-rotating state on a vehicle body, a rotational shaft provided to axially extend in the axle housing and driven by a drive source such as an electric motor for rotation, a wheel mounting cylinder which is rotatably mounted on an end-side periphery of the axle housing through bearings and to which vehicle wheels are mounted, and a reduction gear mechanism provided between the wheel mounting cylinder and the axle housing to decelerate rotation of the rotational shaft, which is transmitted to the wheel mounting cylinder (Patent Documents 1 and 2).

A wet brake formed of a wet multi-plate type of hydraulic brake for applying a braking force to the rotation of the wheel mounting cylinder and a floating seal arranged between the wet brake and the bearings for retaining a cooling liquid of the wet brake in a sealed state to the wheel mounting cylinder are provided between the axle housing and the wheel mounting cylinder.

PRIOR ART DOCUMENTS

Patent Documents

Patent Document 1: Japanese Patent Laid-Open No. 2009-204016 A
Patent Document 2: Japanese Patent Laid-Open No. 2010-116963 A

SUMMARY OF THE INVENTION

Incidentally, since a rotational load of large toque is acted to the travel drive device for the dump truck according to the aforementioned conventional art, lubricant oil is supplied to the bearings and the reduction gear mechanism provided between the axle housing and the wheel mounting cylinder. For isolating the lubricant oil from the cooling liquid in the wet brake side, a floating seal is disposed between the bearings and the wet brake.

However, for example, when a braking operation of applying a braking force by operating the wet brake or releasing the braking force is repeatedly performed in the middle of traveling on a long down-slope, a heat generated amount of the wet brake increases to exceed a capability of the cooling liquid, possibly causing overheating. In the worst case, components of the wet brake are possibly broken or damaged. Further, a metallic seal ring in the floating seal is possibly broken or damaged due to generation of seizing, wear or the like on a sliding surface thereof under such a high-temperature condition. An O-ring of the floating seal is also possibly broken or damaged under an influence of a high temperature or a pressure from the wet brake.

In such a case, there is a possibility that not only a sealing function of the floating seal is lost, but also broken pieces due to breakage and damage of the components from the wet brake and the floating seal enter into an inside of the wheel mounting cylinder as foreign objects and reach to positions of the bearings and the reduction gear mechanism provided between the axle housing and the wheel mounting cylinder. When the component in the reduction gear mechanism is damaged by the foreign object, in the worst case, the dump truck is difficult to drive and travel on its own. Particularly, since the dump truck as a large-sized transporter vehicle is difficult to be trailed by another vehicle, which is different from a general passenger car, it is desirable that the dump truck can travel to a safe place on its own in the meantime.

In view of the above-discussed problem with the conventional art, it is an object of the present invention to provide a travel drive device for a dump truck which can protect a reduction gear mechanism and the like in a wheel mounting cylinder from foreign objects of a wet brake side to enhance durability and reliability of an entire device.

(1) In order to solve the aforementioned problem, the present invention is applied to a travel drive device for a dump truck comprising a cylindrical axle housing mounted in a non-rotating state on a vehicle body of a dump truck; a rotational shaft provided to axially extend in the axle housing and driven and rotated by a drive source; a wheel mounting cylinder which is rotatably provided on an outer peripheral side of the axle housing through wheel support bearings and to which wheels are mounted; a reduction gear mechanism provided between the axle housing and the wheel mounting cylinder to decelerate rotation of the rotational shaft, which is transmitted to the wheel mounting cylinder; a wet brake provided between the axle housing and the wheel mounting cylinder for applying a braking force to rotation of the wheel mounting cylinder; and a seal mechanism positioned between the wet brake and the wheel support bearing and provided between the axle housing and the wheel mounting cylinder for keeping a cooling liquid of the wet brake in a sealed state to a lubricant oil in the wheel mounting cylinder.

The characteristic of the construction adopted in the present invention comprises a foreign-object trapping portion is provided between the wheel support bearing and the seal mechanism for trapping foreign objects flowing from the seal mechanism toward the wheel support bearing.

With this arrangement, even if the foreign object generated in the wet brake or the seal mechanism flows from the wet brake toward the wheel support bearing, the foreign object can be trapped by the foreign-object trapping portion provided in the outer peripheral side of the axle housing. Therefore, this arrangement can prevent the foreign object from reaching to positions of the wheel support bearing and the reduction gear mechanism provided between the axle housing and the wheel mounting cylinder. Since the components in the reduction gear mechanism can be protected from the foreign object in this manner, the dump truck as a large-sized transporter vehicle can drive and travel to a safe place on its own in the meantime.

(2) According to the present invention, the foreign-object trapping portion is configured as a radial gap formed of a gap providing a radial space between a brake hub forming part of the wet brake and a retainer positioning an inner race of the wheel support bearing to the axle housing. With this configuration, the foreign object can be trapped in the radial gap formed between the brake hub and the retainer to prevent the foreign object from flowing in the downstream side.

(3) According to the present invention, a travel drive device for a dump truck comprises a brake hub provided in the wheel mounting cylinder and forming a part of the wet brake to transmit a braking force of the wet brake to the wheel mounting cylinder; and a retainer provided between the axle housing and an inner race of the wheel support bearing and opposing the brake hub through an axial gap to be axially spaced therefrom, wherein: the foreign-object trapping portion is formed as a radial gap which provides a radial space between the brake hub and the retainer in a state of being communicated with the axial gap and is smaller than the axial gap. With this arrangement, the retainer opposing the brake hub through the axial gap can form the radial gap of a dimension, which is smaller than that of the axial gap, between the retainer and the brake hub to trap the foreign object within the radial gap.

(4) According to the present invention, a travel drive device for a dump truck comprises a brake hub provided in the wheel mounting cylinder and forming a part of the wet brake to transmit a braking force of the wet brake to the wheel mounting cylinder; and a retainer provided between the axle housing and an inner race of the wheel support bearing and opposing the brake hub through an axial gap to be axially spaced therefrom, wherein: the seal mechanism comprises a floating seal formed by including a pair of seal rings and a pair of O-rings to seal the axial gap between the brake hub and the retainer; the brake hub is provided with a hub-side O-ring receiving portion axially extending toward the retainer to receive one O-ring in the floating seal; the retainer is provided with a retainer-side O-ring receiving portion axially opposing the hub-side O-ring receiving portion through the axial gap to receive other O-ring in the floating seal, and a cylindrical projecting portion formed to axially extend to a radial outer position than the retainer-side O-ring receiving portion and radially opposing the hub-side O-ring receiving portion; and the foreign-object trapping portion is formed as a radial gap which provides a radial space between the hub-side O-ring receiving portion and the cylindrical projecting portion in a state of being communicated with the axial gap and is smaller than the axial gap.

According to the above arrangement, the foreign-object trapping portion may be configured as the radial gap which provides a radial space between the hub-side O-ring receiving portion provided in the brake hub and the cylindrical projecting portion in the retainer. Therefore, the foreign-object trapping portion is configured such that the radial gap is radially curved in an L-letter shape to the axial gap of the floating seal. Accordingly, even in a case where the foreign object passes through the axial gap between the brake hub and the retainer, the foreign object can be trapped by the foreign-object trapping portion formed to be curved in an L-letter shape to prevent the foreign object from flowing to the downstream side.

(5) According to the present invention, the retainer is provided with an annular thickened portion on a surface radially opposing the brake hub, wherein the radial gap is formed by the annular thickened portion. Therefore, the process of making the radial gap between the brake hub and the annular thickened portion as small as possible can be relatively easily executed. That is, the foreign-object trapping portion can be formed in a simple process to improve the foreign-object trapping function.

MODE FOR CARRYING OUT THE INVENTION

Hereinafter, a travel drive device for a dump truck according to embodiments of the present invention will be in detail explained with reference to the accompanying drawings, by taking a dump truck of a rear-wheel drive type as an example.

FIG. 1 to FIG. 5 show a travel drive device for a dump truck according to a first embodiment of the present invention.

Figure 1:
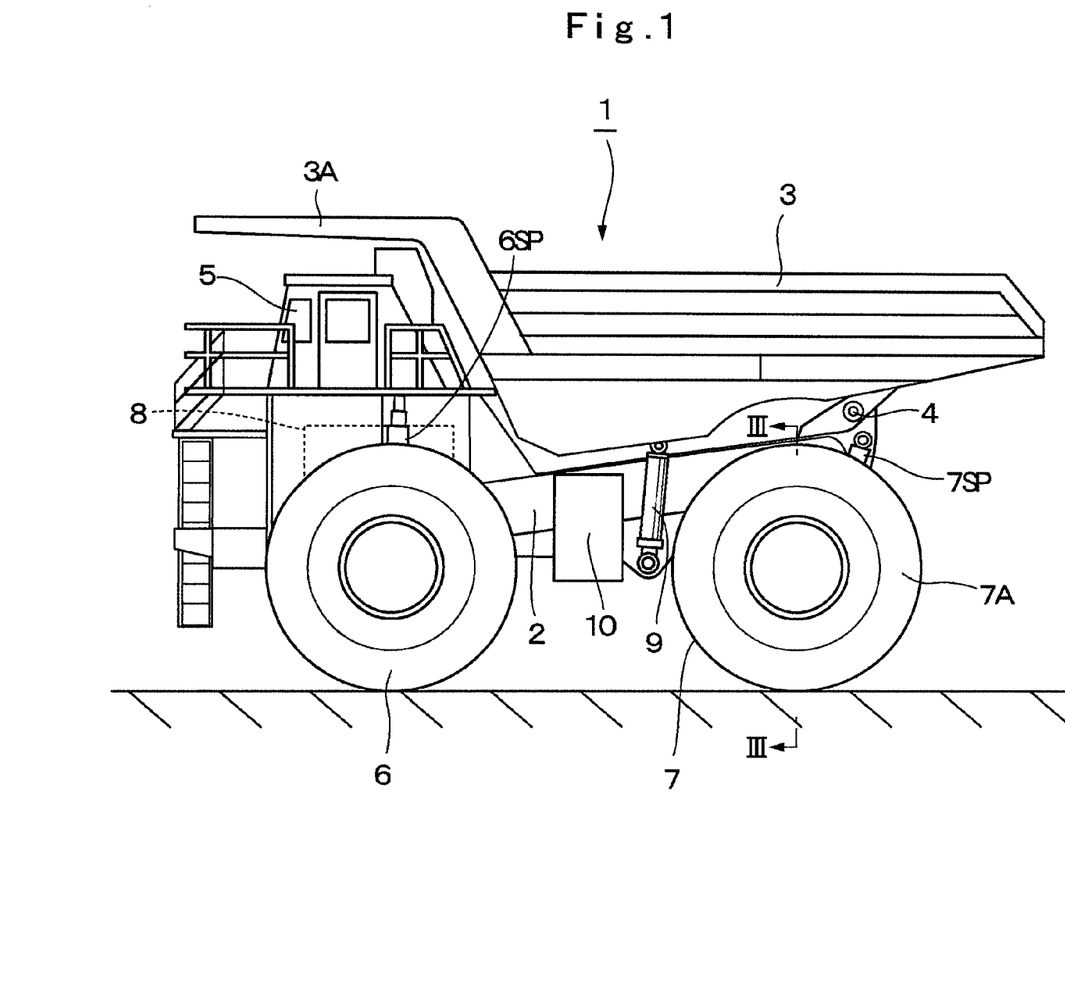
FIG. 1 is a side view showing a dump truck to which a travel drive device according to a first embodiment of the present invention is applied.

In the figure, designated at 1 is a dump truck adopted in the first embodiment. As shown in FIG. 1, the dump truck 1 is constituted by including a vehicle body 2 having a strong frame structure and a vessel 3 as a loading platform liftably mounted on the vehicle body 2.

The vessel 3 is formed as a large-sized container of an entire length of 10 to 13 meters for loading a large volume of heavy baggage such as crushed stones. A rear-side bottom portion of the vessel 3 is liftably (tiltably) connected to a rear end side of the vehicle body 2 through a connecting pin 4. A protector 3A is integrally provided in a front-side top portion of the vessel 3 in such a manner as to cover a cab 5 to be described later from the upper side.

The cab 5 is provided in the front portion of the vehicle body 2 to be positioned under the protector 3A. The cab 5 forms an operator's room which the operator of the dump truck 1 gets in and off. An operator's seat, an activation switch, an accelerator pedal, a brake pedal, a handle for steering, and a plurality of operating levers (any of them is not shown) are provided inside of the cab 5. The protector 3A of the vessel 3 has functions of protecting the cab 5 from flying stones such as rocks by substantially completely covering the cab 5 from the upper side, and protecting the operator inside the cab 5 at the falling-down of a vehicle (dump truck 1).

Left and right front wheels 6 are rotatably provided on the front side of the vehicle body 2. Each front wheel 6 forms a steered wheel which is steered by an operator of the dump truck 1. Further, the front wheel 6 is formed in a tire diameter (that is, outer diameter dimension), for example, as long as 2 to 4 meters in the same way as each of rear wheels 7 to be described later. A front-wheel side suspension 6SP formed by a hydraulic shock absorber is provided between the front portion of the vehicle body 2 and the front wheel 6.

Figure 3:
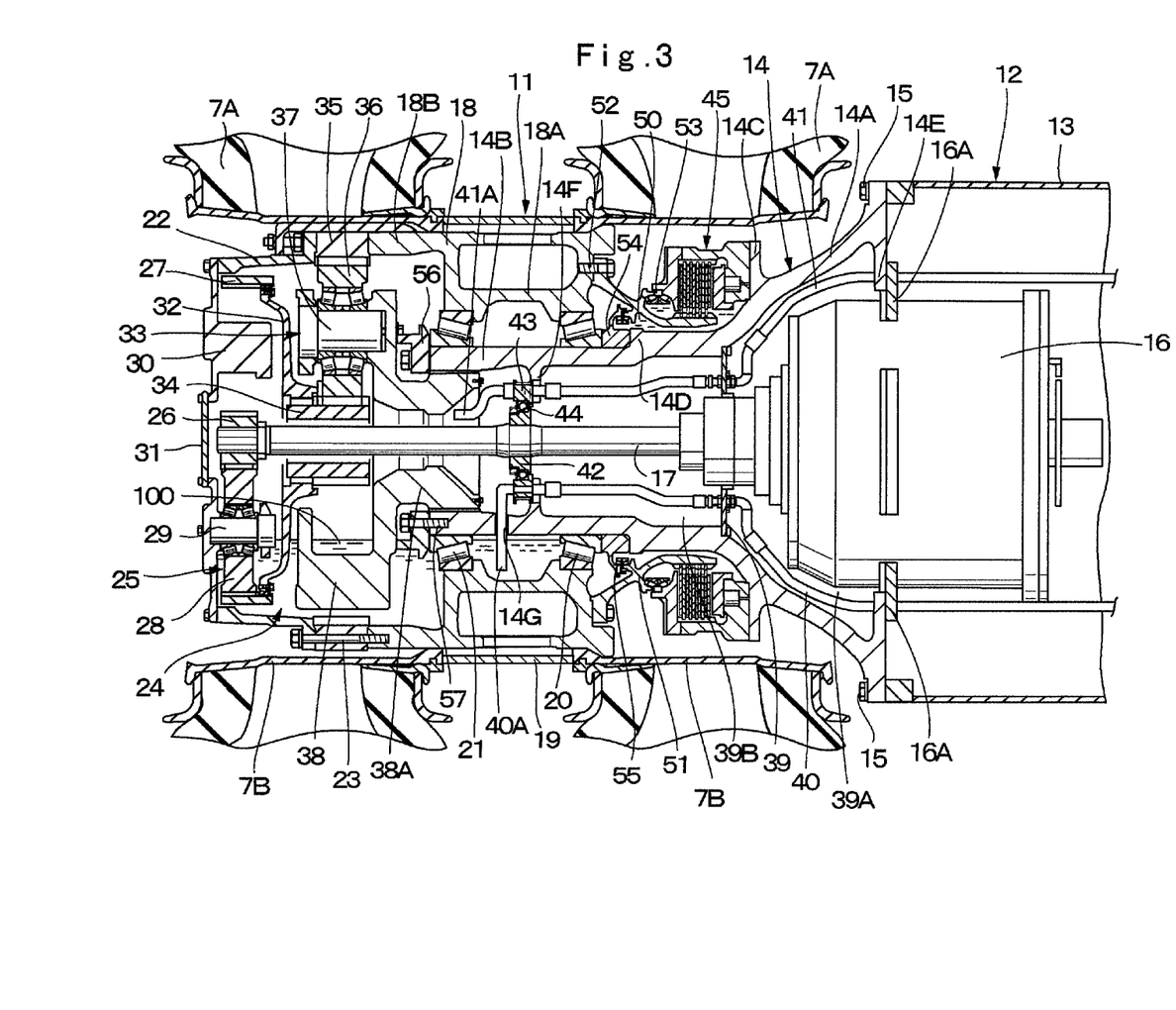
FIG. 3 is an enlarged cross-sectional view showing the travel drive device in the rear wheel side, taken in the direction of the arrows in FIG. 1.

The left and right rear wheels 7 are rotatably provided on the rear side of the vehicle body 2. Each rear wheel 7 forms a drive wheel of the dump truck 1 which is driven and rotated integrally with a wheel mounting cylinder 18 by a travel drive device 11 to be described later as shown in FIG. 3. Each rear wheel 7 is constituted by including dual tires of an inner tire 7A and an outer tire 7A, and rims 7B disposed in a radial inside of the respective tires 7A. A rear-wheel side suspension 7SP formed by a hydraulic shock absorber is provided between the rear portion of the vehicle body 2 and the rear wheel 7.

An engine 8 is provided in the vehicle body 2 to be positioned under the cab 5. The engine 8 is constituted by, for example, a large-sized diesel engine and drives an on-board power generator and a hydraulic pump as a hydraulic source (any thereof is not shown) for rotation. Pressurized oil discharged from the hydraulic pump is supplied to hoist cylinders 9, a steering cylinder for power steering (not shown) and the like.

The hoist cylinder 9 is a cylinder apparatus for lifting the vessel 3. As shown in FIG. 1, the hoist cylinder 9 is positioned between the front wheel 6 and the rear wheel 7 to be disposed in each of both left and right sides of the vehicle body 2. Each of the hoist cylinders 9 is mounted between the vehicle body 2 and the vessel 3 to telescopically operate in the upper-lower direction. Each of the hoist cylinders 9 expands and contracts in the upper-lower direction by supply/discharge of the pressurized oil from/to the hydraulic pump to lift (tilt) the vessel 3 around the connecting pin 4 of the rear side.

As shown in FIG. 1, an operating oil tank 10 is mounted to a side of the vehicle body 2 or the like to be positioned under the vessel 3. Operating oil accommodated in the operating oil tank 10 is suctioned by the hydraulic pump and discharged therefrom to be pressurized oil, which is supplied/discharged to/from the hoist cylinder 9, the steering cylinder for power steering, and the like.

Next, an explanation will be made of each of the travel drive devices 11 which are provided to the side of the rear wheel 7 in the dump truck 1 and form a key part of the first embodiment.

The travel drive device 11 is constituted by including an axle housing 12, a wheel drive motor 16, a wheel mounting cylinder 18 and a reduction gear mechanism 24, which will be described later. The travel drive device 11 decelerates rotation of the wheel drive motor 16 by the reduction gear mechanism 24 and drives the rear wheel 7 as drive wheel of vehicle together with the wheel mounting cylinder 18 by large rotational torque for traveling.

Denoted at 12 is the axle housing for the rear wheel 7, which is provided under the rear side of the vehicle body 2 and the axle housing 12 is formed in a cylindrical body which axially extends between the left and right rear wheels 7. The axle housing 12 is constituted by an intermediate suspension tube 13 mounted to the rear side of the vehicle body 2 through the rear-wheel side suspension 7SP and a spindle 14 mounted to each of both left and right sides of the suspension tube 13, which will be described later.

The spindles 14 are provided respectively at axial both sides of the axle housing 12 and each spindle 14 is formed in a cylindrical body. As shown in FIG. 3, the spindle 14 is formed of a large-diameter cylindrical portion 14A positioned at an axial one side, formed to be tapered and removably fixed to the suspension tube 13 through bolts 15, and a circular cylindrical portion 14B formed integrally with the axial other side of the large-diameter cylindrical portion 14A. The circular cylindrical portion 14B is arranged to axially extend within the wheel mounting cylinder 18 to be described later. An outer peripheral side of the circular cylindrical portion 14B rotatably supports the wheel mounting cylinder 18 in the side of the rear wheel 7 through wheel support bearings 20 and 21 to be described later.

Here, the spindle 14 has an outer peripheral side formed integrally with an annular flange portion 14C which radially outwardly projects from an intermediate section of the large-diameter cylindrical portion 14A in a length direction (axially) and to which a wet brake 45 to be described later is mounted, and with an annular step portion 14D provided to the circular cylindrical portion 14B at an axial one side for axially positioning a retainer 54 to be described later. A plurality of motor mounting seats 14E are formed integrally to the large-diameter cylindrical portion 14A at an axial one side to radially inwardly project therefrom, and wheel drive motors 16 to be described later are mounted to the motor mounting seats 14E.

On the other hand, an axial other side (tip end side) of the circular cylindrical portion 14B is formed as an opening end, and a cylindrical projecting section 38A of a carrier 38 to be described later is a spline-coupled to an inner side of the circular cylindrical portion 14B. An annular inward projecting portion 14F is formed integrally at an inner peripheral side of an axial intermediate section of the circular cylindrical portion 14B, and an outer retainer 43 to be described later is mounted to the inward projecting portion 14F through bolts or the like. A radial hole 14G is formed in the bottom side of the circular cylindrical portion 14B to penetrate and extend therethrough in an upper-lower direction (radial direction of the circular cylindrical portion 14B), and a suction pipe 40 to be described later is inserted into the radial hole 14G.

Figure 2:
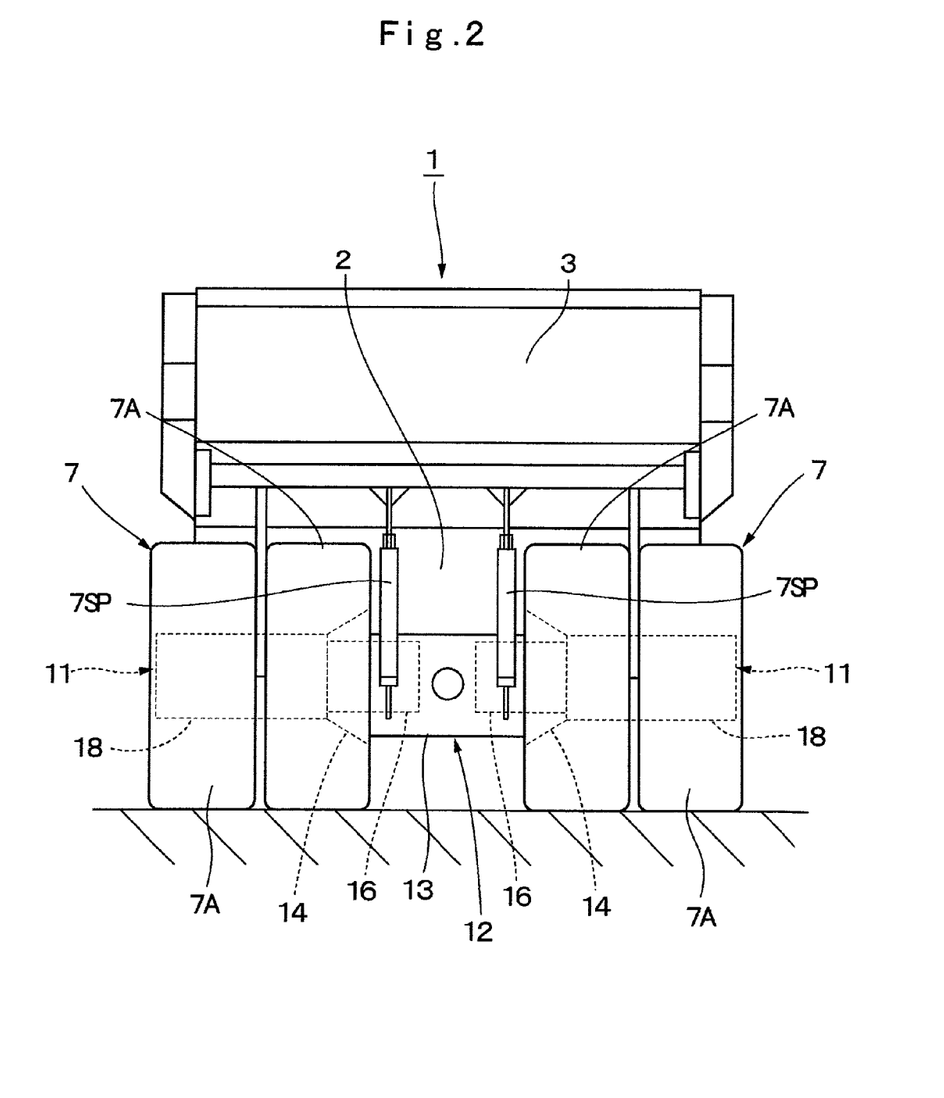
FIG. 2 is a rear view showing the dump truck in FIG. 1 as viewed from the backside.

The wheel drive motor 16 is removably mounted in the axle housing 12, and the wheel drive motor 16 is used as a drive source of the rear wheel 7. The wheel drive motor 16 is formed of a large-sized electric motor driven and rotated by power supply from a power generator (not shown) mounted on the vehicle body 2. As shown in FIG. 2, each of the wheel drive motors 16 is respectively mounted within each of the spindles 14 to be positioned in each of left and right sides of the suspension tube 13 to drive and rotate the left and right rear wheels 7 independently with each other. The wheel drive motor 16 is provided at an outer peripheral side with a plurality of mounting flanges 16A which are removably mounted to the motor mounting seat 14E of the spindle 14 by using bolts or the like. The wheel drive motor 16 is configured to drive and rotate a rotational shaft 17 to be described later by supplying power from the power generator.

The rotational shaft 17 is configured as an output shaft of the wheel drive motor 16 and the rotational shaft 17 is driven and rotated in the forward or backward direction by the wheel drive motor 16. The rotational shaft 17 is formed of a single, elongated, bar-shaped body extending in an axial direction (left-right direction) at the inner peripheral side of the spindle 14 and one end side of the rotational shaft 17 is connected to an output side of the wheel drive motor 16. On the other hand, the other end side of the rotational shaft 17 projects from an opening end side of the circular cylindrical portion 14B forming the spindle 14 and to a projecting end of which a sun gear 26 to be described later is mounted. An axial intermediate section of the rotational shaft 17 is positioned between the wheel support bearings 20 and 21 to be described later and is rotatably supported by using a shaft bearing 44 to be described later.

Denoted at 18 is the wheel mounting cylinder rotating integrally with the rear wheel 7 as a wheel. The wheel mounting cylinder 18 forms a so-called wheel hub, and has the outer peripheral side to which each rim 7B of the rear wheel 7 is removably mounted by using means such as press-fitting. The wheel mounting cylinder 18 is formed as a stepped cylindrical body by a hollow cylindrical portion 18A axially extending between the wheel support bearings 20 and 21 to form a hollow structure, and an extending cylindrical portion 18B axially extending integrally from an outer peripheral end portion of the hollow cylindrical portion 18A to an internal gear 35 to be described later.

The internal gear 35 and an outer drum 22 to be described later are integrally fixed to the extending cylindrical portion 18B of the wheel mounting cylinder 18 by using long bolts 23.

Therefore, the wheel mounting cylinder 18 is rotated integrally with the internal gear 35. That is, rotation of large torque obtained by decelerating the rotation of the wheel drive motor 16 with the reduction gear mechanism 24 is transmitted to the wheel mounting cylinder 18 through the internal gear 35. Therefore, the wheel mounting cylinder 18 rotates the rear wheel 7 as the drive wheel in a vehicle with the large rotational torque.

A rim spacer 19 is formed by a cylindrical ring. The rim spacer 19 is arranged at the outer peripheral side of the wheel mounting cylinder 18 to ensure a predetermined axial gap between an inner tire 7A and an outer tire 7A in the rear wheel 7. That is, as shown in FIG. 3, the rim spacer 19 is sandwiched tightly between a rim 7B in an axial inside and a rim 7B in an axial outside of the rear wheel 7 to keep a space therebetween to be axially constant.

Denoted at 20 and 21 are the wheel support bearings for rotatably supporting the wheel mounting cylinder 18 on the outer peripheral side of the spindle 14 and the wheel support bearings 20 and 21 are configured, for example, by using the same tapered roller bearing or the like. The wheel support bearings 20 and 21 are arranged to be spaced apart axially between the circular cylindrical portion 14B of the spindle 14 and the hollow cylindrical portion 18A of the wheel mounting cylinder 18. That is, the one wheel support bearing 20 is positioned to the step portion 14D of the spindle 14 through the retainer 54 to be described later and the other wheel support bearing 21 is positioned to an opening end-side outer periphery of the circular cylindrical portion 14B of the spindle 14 through another retainer 56.

Each inner race of the wheel support bearings 20 and 21 is axially positioned between the retainers 54 and 56 to the circular cylindrical portion 14B of the spindle 14. Each outer race of the wheel support bearings 20 and 21 is axially positioned to the hollow cylindrical portion 18A of the wheel mounting cylinder 18. Therefore, the wheel mounting cylinder 18 is axially positioned to the spindle 14 by using the wheel support bearings 20 and 21 and the retainers 54 and 56, and is supported to the spindle 14 to be rotatable in a circumferential direction thereto.

The outer drum 22 forms a part of the wheel mounting cylinder 18 together with the internal gear 35. As shown in FIG. 3, the outer drum 22 is mounted in a position at an axial outside of the wheel mounting cylinder 18 to sandwich the internal gear 35 to be described later therebetween and is removably fixed to the wheel mounting cylinder 18 by using a plurality of long bolts 23.

Next, an explanation will be made of the reduction gear mechanism 24 provided between the spindle 14 and the wheel mounting cylinder 18.

The reduction gear mechanism 24 is constituted by a first-stage planetary gear reduction mechanism 25 and a second-stage planetary gear reduction mechanism 33 to be described later. The reduction gear mechanism 24 decelerates rotation of the wheel drive motor 16 (that is, rotational shaft 17), which is transmitted to the wheel mounting cylinder 18 at the side of the rear wheel 7. Therefore, the wheel mounting cylinder 18 at the side of the rear wheel 7 is driven and rotated together with the rear wheel 7 by a large rotational force (torque) obtained by the deceleration.

Denoted at 25 is the first-stage planetary gear reduction mechanism forming the reduction gear mechanism 24 and the first-stage planetary gear reduction mechanism 25 is constituted by the sun gear 26 spline-coupled to the tip end side as a free end of the rotational shaft 17, a plurality (for example, three or four pieces) of planetary gears 28 meshed with the sun gear 26 and a ring-shaped internal gear 27, and a carrier 30 rotatably supporting the respective planetary gears 28 through support pins 29.

Here, the carrier 30 is removably fixed at its outer peripheral side to an opening end (an end surface at an axial outside) of the outer drum 22 integrated with the wheel mounting cylinder 18 through bolts, and rotates integrally with the wheel mounting cylinder 18 and the outer drum 22. For example, a disk-shaped lid plate 31 is removably mounted to the inner peripheral side of the carrier 30. The lid plate 31 is removed from the carrier 30, for example, at the time of maintenance or inspection of meshing parts between the sun gear 26 and the planetary gears 28.

The ring-shaped internal gear 27 is formed by using a ring gear to surround the sun gear 26 and the respective planetary gears 28 from a radial outside, and the internal gear 27 is relatively rotatably located as having a narrow radial gap to an inner peripheral surface of the outer drum 22. The rotation (revolving movement) of the internal gear 27 is transmitted to a second-stage planetary gear reduction mechanism 33 through a coupling 32 to be described later.

As the sun gear 26 is rotated integrally with the rotational shaft 17 by the wheel drive motor 16, the first-stage planetary gear reduction mechanism 25 converts the rotation of the sun gear 26 into a rotating movement of each planetary gear 28 and a revolving movement thereof. Further, the rotating movement (rotation) of each planetary gear 28 is transmitted to the ring-shaped internal gear 27 as a decelerated rotation. The rotation of the internal gear 27 is transmitted to the second-stage planetary gear reduction mechanism 33 through the coupling 32 to be described later. On the other hand, the revolving movement of each planetary gear 28 is transmitted to the outer drum 22 in the side of the wheel mounting cylinder 18 by way of rotation of the carrier 30. However, since the wheel mounting cylinder 18 rotates integrally with the second-stage internal gear 35 to be described later, the revolving movement of each planetary gear 28 is suppressed into rotation in synchronization with the internal gear 35 (the wheel mounting cylinder 18).

The coupling 32 rotates integrally with the first-stage internal gear 27 and the coupling 32 is in the form of an annular rotation transmitting member which is located in a position between the first-stage planetary gear reduction mechanism 25 and the second-stage planetary gear reduction mechanism 33. That is, an outer peripheral side of the coupling 32 is spline-coupled to the first-stage internal gear 27. An inner peripheral side of the coupling 32 is spline-coupled to a second-stage sun gear 34 to be described later. Thus, the coupling 32 transmits rotation of the first-stage internal gear 27 to the second-stage sun gear 34 to rotate the sun gear 34 integrally with the first-stage internal gear 27. A plurality of oil holes may be formed in the coupling 32 to circulate lubricant oil 100 to be described later in the front-rear direction (axial direction).

Denoted at 33 is the second-stage planetary gear reduction mechanism and the planetary gear reduction mechanism 33 is located between the rotational shaft 17 and the wheel mounting cylinder 18 through the first-stage planetary gear reduction mechanism 25 and decelerates the rotation of the rotational shaft 17 together with the first-stage planetary gear reduction mechanism 25. The second-stage planetary gear reduction mechanism 33 is constituted by the cylindrical sun gear 34 which is mounted coaxially with the rotational shaft 17 and rotates integrally with the coupling 32, a plurality of planetary gears 36 (only one of which is shown in the figure) which are meshed with the sun gear 34 and the ring-shaped internal gear 35, and a carrier 38 which rotatably supports the respective planetary gears 36 through support pins 37.

Here, the second-stage internal gear 35 is formed by using a ring gear to surround the sun gear 34, the respective planetary gears 36, and the like from a radial outside. The internal gear 35 is integrally fixed between the extending cylindrical portion 18B forming a part of the wheel mounting cylinder 18 and the outer drum 22 by using the long bolts 23. Further, internal teeth formed over the entire periphery on the inner peripheral side of the internal gear 35 are meshed with the respective planetary gears 36.

The second-stage carrier 38 is integrally formed with a cylindrical projecting section 38A at its inner central portion, in fitting engagement with the circular cylindrical portion 14B of the spindle 14 from the opening end side. This cylindrical projecting section 38A is removably spline-coupled to an inner peripheral side of the circular cylindrical portion 14B. The rotational shaft 17 and a supply pipe 41 to be described later are inserted into the inner peripheral side of the cylindrical projecting section 38A.

Here, in the second-stage planetary gear reduction mechanism 33, the cylindrical projecting section 38A of the carrier 38 is spline-coupled to the circular cylindrical portion 14B of the spindle 14, thereby restraining revolving movements of the respective planetary gears 36 (rotation of the carrier 38). Therefore, as the sun gear 34 rotates integrally with the coupling 32, the second-stage planetary gear reduction mechanism 33 converts the rotation of the sun gear 34 into rotation of each of the planetary gears 36. As a result, the rotation of each of the planetary gears 36 is transmitted to the second-stage internal gear 35, and the internal gear 35 is decelerated for rotation. Therefore, the rotational torque of large output decelerated at the two-stage through the first and second-stage planetary gear reduction mechanisms 25 and 33 is transmitted to the wheel mounting cylinder 18 to which the internal gear 35 is fixed.

Next, a lubricating system for lubricating the reduction gear mechanism 24 will be explained. The lubricating system is constituted by including a partition wall 39, a suction pipe 40, a supply pipe 41, an inner retainer 42, an outer retainer 43, a shaft bearing 44 and the like.

Here, the lubricant oil 100 is reserved inside the wheel mounting cylinder 18, and the respective planetary gear reduction mechanisms 25 and 33 operate in a state where the lubricant oil 100 is supplied all the time. In this case, an oil surface of the lubricant oil 100 is lower than, for example, the lowest section of the circular cylindrical portion 14B forming the spindle 14 and is set in a position where a lower side section of each of the wheel support bearings 20 and 21 is immersed. In consequence, at the operating of the travel drive device 11, the temperature rise of lubricant oil 100 can be restricted by being stirred with the respective planetary gear reduction mechanisms 25 and 33, and a stirring resistance of the lubricant oil 100 can be restricted.

The partition wall 39 is provided in the spindle 14. The partition wall 39 is formed of an annular plate and is removably fixed at its outer peripheral side to an inner peripheral side of the large-diameter cylindrical portion 14A of the spindle 14 by using bolts or the like. Here, the partition wall 39 is configured to divide an inside of the spindle 14 into a motor accommodating space portion 39A positioned at its axial one side for accommodating the wheel drive motor 16 and a cylindrical space portion 39B positioned at its axial other side for communicating with the inside of the wheel mounting cylinder 18 all the time.

The suction pipe 40 collects the lubricant oil 100 reserved in the wheel mounting cylinder 18 and the suction pipe 40 has one side in the length direction axially extending within the suspension tube 13 of the axle housing 12 to be connected to a suction side of a lubricating pump (not shown). An intermediate section of the suction pipe 40 in the length direction axially extends within the spindle 14 toward the side of the wheel mounting cylinder 18. A tip end side 40A (the other side in the length direction) of the suction pipe 40 is bent in an L-letter shape downward from a lower side of the rotational shaft 17 to insert into a radial hole 14G of the spindle 14. Therefore, the suction pipe 40 is immersed at its tip end side 40A in the lubricant oil 100 in the wheel mounting cylinder 18 to collect the lubricant oil 100 to the side of the lubricating pump.

The supply pipe 41 supplies lubricant oil 100 into the reduction gear mechanism 24. The supply pipe 41 is located above the suction pipe 40 and the rotational shaft 17 in the spindle 14, and a tip end side 41A of which is inserted into the cylindrical projecting section 38A of the second-stage carrier 38. One side (base end side) in the length direction of the supply pipe 41 is connected to a discharge side of the lubricating pump. The lubricant oil 100 discharged from the lubricating pump is supplied from a tip end side 41A (the other side in the length direction) of the supply pipe 41 toward the cylindrical projecting section 38A in the carrier 38, that is, toward the planetary gear reduction mechanisms 25 and 33.

The lubricant oil 100 reserved in a bottom side of the wheel mounting cylinder 18 is suctioned from a tip end side 40A of the suction pipe 40 by driving the lubricating pump, and the lubricant oil 100 suctioned by the lubricating pump is cooled by an oil cooler (not shown). The cooled lubricant oil 100 is thereafter supplied through the supply pipe 41 to the planetary gear reduction mechanisms 25 and 33, thus lubricating the planetary gear reduction mechanisms 25 and 33.

Denoted at 42 is the inner retainer provided to fit into an axial intermediate section of the rotational shaft 17 and denoted at 43 is an outer retainer located at the outer peripheral side of the inner retainer 42 through the shaft bearing 44. Here, the inner retainer 42 is press-fitted at its inner peripheral side into the intermediate section of the rotational shaft 17 to rotate integrally with the rotational shaft 17. The outer retainer 43 is fixed to an inward projecting portion 14F of the spindle 14 by using bolts or the like. As shown in FIG. 3, mid-sections of the suction pipe 40 and the supply pipe 41 extend to axially penetrate through the outer retainer 43, so that the suction pipe 40 and the supply pipe 41 are positioned in the spindle 14 through the outer retainer 43.

The shaft bearing 44 is located between the inner retainer 42 in the side of the rotational shaft 17 and the outer retainer 43 in the side of the spindle 14. The shaft bearing 44 rotatably supports the axial intermediate section of the rotational shaft 17 through the inner retainer 42 and the outer retainer 43 in the circular cylindrical portion 14B of the spindle 14. Therefore, the core swing in the axial intermediate section of the long rotational shaft 17 can be suppressed, and the long rotational shaft 17 can transmit stable rotation of the rotational shaft 17 to the first-stage sun gear 26.

Next, descriptions will be made of the wet brake 45 for applying braking forces to the rotation of the wheel mounting cylinder 18, that is, the left and right rear wheels 7.

The wet brake 45 is constituted by a hydraulic brake of a wet multi-plate type. The wet brake 45 is provided through a brake hub 51 to be described later between the spindle 14 in the axle housing 12 and the wheel mounting cylinder 18. The wet brake 45 applies braking forces to the brake hub 51 rotating together with the wheel mounting cylinder 18.

Figure 4:
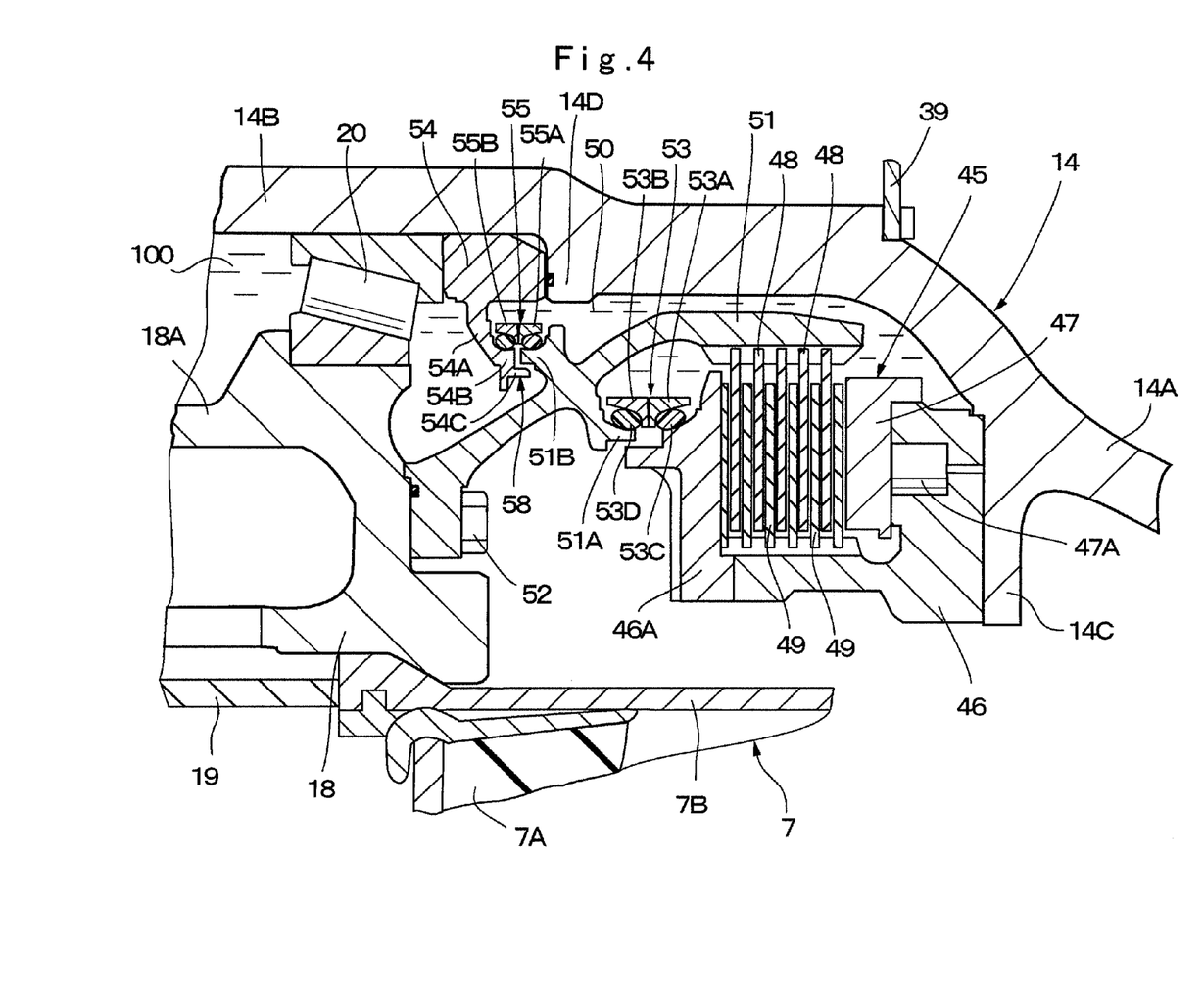
FIG. 4 is an enlarged cross-sectional view showing a wet brake, a brake hub, a retainer, a floating seal and the like in FIG. 3.

As shown in FIG. 4, the wet brake 45 is constituted by including a brake housing 46 provided to be fixed to an annular flange portion 14C of the spindle 14, a brake movable body 47 slidably provided in the brake housing 46 to be driven together with a plurality of pistons 47A by supplying pressurized oil to a brake oil chamber (not shown) from an outside, a plurality of rotating discs 48 provided between the brake movable body 47 and an end plate 46A of the brake housing 46 to rotate together with the brake hub 51 to be described later, a plurality of non-rotating discs 49 provided in the brake housing 46 to be positioned between the end plate 46A and the brake movable body 47 and making frictional contact with the respective rotating discs 48, and an urging spring (not shown) for urging the brake movable body 47 together with the piston 47A in the releasing direction of braking forces all the time.

The brake housing 46 has the end plate 46A in a position of sandwiching the respective discs 48 and 49 between the brake movable body 47 and the end plate 46A, and a floating seal 53 to be described later is provided at an inner peripheral side of the end plate 46A. A plurality of the rotating discs 48 and a plurality of the non-rotating discs 49 are arranged to be alternately combined between the end plate 46A of the brake housing 46 and the brake movable body 47. Here, each of the non-rotating discs 49 is mounted on an outer peripheral side thereof not to rotate to the brake housing 46 and to be axially movable thereto. On the other hand, a plurality of the rotating discs 48 is mounted on an inner peripheral side thereof not to rotate to the brake hub 51 to be described later and to be axially movable thereto.

According to the wet brake 45, when an operator of the dump truck 1 depresses a brake pedal (not shown), pressurized oil supplied to the brake housing 46 caused by this brake pedal depression drives the brake movable body 47 against the urging spring. Thereby the brake movable body 47 presses the respective non-rotating discs 49 in such a manner as to sandwich the respective rotating discs 48 at both sides therebetween, thus applying braking forces to the brake hub 51 rotating integrally with the wheel mounting cylinder 18. On the other hand, when the supply of the pressurized oil is stopped, the brake movable body 47 is returned back by the urging spring, and the braking force to the brake hub 51 is released.

Here, the cooling liquid 50 is accommodated in the wet brake 45. The respective rotating discs 48 and the respective non-rotating discs 49 are immersed in the cooling liquid 50 to be cooled, thereby releasing the frictional heat generated at braking. The cooling liquid 50 is made up of an oil liquid different kind from the lubricant oil 100. The floating seal 53 to be described later has a function of preventing the cooling liquid 50 from leaking from a boundary between the endplate 46A of the brake housing 46 and the brake hub 51 to an outside. On the other hand, the floating seal 55 to be described later is provided between the retainer 54 to be described later and the brake hub 51 and has a function of separating the lubricant oil 100 from the cooling liquid 50 and keeping them in a sealed state.

Denoted at 51 is the brake hub forming a part of the wet brake 45 and rotating together with the wheel mounting cylinder 18. The brake hub 51 is formed as a cylindrical body axially extending between the spindle 14 and the wet brake 45. The respective rotating discs 48 of the wet brake 45 are mounted in an axial one side of the brake hub 51 to be axially movable in a non-rotating state. The axial other side of the brake hub 51 is removably fixed to the hollow cylindrical portion 18A of the wheel mounting cylinder 18 through a plurality of bolts 52.

A brake-side O-ring receiving portion 51A and a hub-side O-ring receiving portion 51B are provided in an axial intermediate section of the brake hub 51. The brake-side O-ring receiving portion 51A extends from the axial intermediate section of the brake hub 51 to the radial outside thereof, and a tip end side thereof axially extends toward the end plate 46A of the wet brake 45. The hub-side O-ring receiving portion 51B extends from the axial intermediate section of the brake hub 51 to the radial inner side thereof, and a tip end side thereof axially extends toward the retainer 54 to be described later. The brake-side O-ring receiving portion 51A of the brake hub 51 is provided with the floating seal 53 for leakage prevention. The floating seal 55 for liquid separation is provided with the hub-side O-ring receiving portion 51B. The hub-side O-ring receiving portion 51B receives an O-ring 55C of the floating seal 55 to be described later from the radial outside.

Denoted at 53 is the floating seal for leakage prevention for preventing the cooling liquid 50 of the wet brake 45 from leaking to an outside. The floating seal 53 is provided between the end plate 46A of the brake housing 46 and the brake-side O-ring receiving portion 51A of the brake hub 51 to prevent the cooling liquid 50 from leaking from a gap therebetween to an outside. Here, the floating seal 53 also has a function of preventing foreign objects such as earth and sand, rain water, and the like from entering into the wet brake 45.

Figure 5:
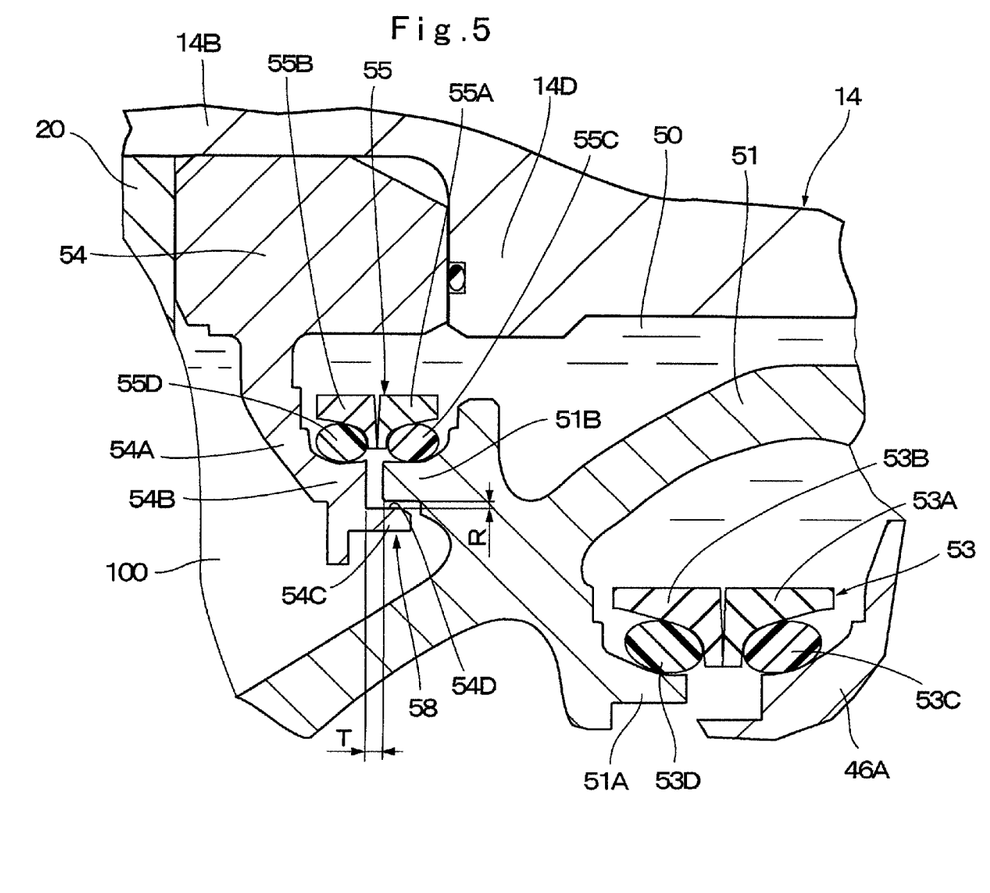
FIG. 5 is a further enlarged cross-sectional view showing the brake hub, the retainer, the floating seal and the like in FIG. 4.

As shown in FIG. 5, the floating seal 53 is constituted by a pair of seal rings 53A and 53B arranged on an inner peripheral surface of the end plate 46A and an inner peripheral surface of the brake-side O-ring receiving portion 51A to radially oppose thereto and having seal surfaces making sliding contact with each other, and a pair of O-rings 53C and 53D. Here, the respective O-rings 53C and 53D are provided to be sandwiched respectively between the respective seal rings 53A and 53B, and the inner peripheral surface of the end plate 46A and the inner peripheral surface of the brake-side O-ring receiving portion 51A. Therefore, the O-ring 53C seals a boundary between the end plate 46A and the seal ring 53A, and the O-ring 53D seals a boundary between the brake-side O-ring receiving portion 51A and the seal ring 53B. Further, each of the O-rings 53C and 53D applies an axial pressing force to each of the seal rings 53A and 53B and also seals a boundary between the seal rings 53A and 53B.

Denoted at 54 is the retainer for positioning an inner race of the wheel support bearing 20 to the circular cylindrical portion 14B of the spindle 14, and the retainer 54 is provided to be fitted into the outer peripheral surface of the circular cylindrical portion 14B. An axial one side of the retainer 54 abuts against the annular step portion 14D of the spindle 14. An axial other side of the retainer 54 axially abuts against the inner race of the wheel support bearing 20. Therefore, in the wheel support bearing 20, the outer race is axially positioned by the hollow cylindrical portion 18A of the wheel mounting cylinder 18 and the inner race is axially positioned by the retainer 54.

The retainer 54 is provided integrally with a sealing arm portion 54A, a retainer-side O-ring receiving portion 54B and a cylindrical projecting portion 54C. That is, the sealing arm portion 54A obliquely extends in a radial outside toward the hub-side O-ring receiving portion 51B of the brake hub 51. The retainer-side O-ring receiving portion 54B is formed integrally with a tip end side of the sealing arm portion 54A. The retainer-side O-ring receiving portion 54B and the hub-side O-ring receiving portion 51B are opposed with each other through an axial gap T (dimension T shown in FIG. 5) formed as a gap providing an axial space therebetween. The cylindrical projecting portion 54C is formed in a position which is a radial outside of the retainer-side O-ring receiving portion 54B to be curved in an L-letter shape, and axially extends to surround the hub-side O-ring receiving portion 51B from a radial outside. An inner peripheral surface of the cylindrical projecting portion 54C forms an opposing surface portion 54D radially opposing the hub-side O-ring receiving portion 51B. A radial gap R (dimension R shown in FIG. 5) is formed as a gap providing an axial space between the opposing surface portion 54D and the hub-side O-ring receiving portion 51B.

In other words, in the retainer 54, the retainer-side O-ring receiving portion 54B is formed to be axially spaced by the axial gap T from the hub-side O-ring receiving portion 51B. The cylindrical projecting portion 54C of the retainer 54 is formed to be radially spaced by the radial gap R from the hub-side O-ring receiving portion 51B. Here, the radial gap R is communicated with the axial gap T, and is smaller than the axial gap T (R<T).

Denoted at 55 is the floating seal for liquid separation provided between the brake hub 51 and the retainer 54. The floating seal 55 separates the lubricant oil 100 in the side of the wheel mounting cylinder 18 from the cooling liquid 50 in the side of the wet brake 45 with each other, forming a seal mechanism for keeping them in a sealed state. That is, the floating seal 55 is provided between the hub-side O-ring receiving portion 51B of the brake hub 51 and the retainer-side O-ring receiving portion 54B of the retainer 54 to seal the axial gap T therebetween liquid-tightly.

Here, the floating seal 55 is constituted by a pair of seal rings 55A and 55B arranged on an inner peripheral surface of the hub-side O-ring receiving portion 51B and on an inner peripheral surface of the retainer-side O-ring receiving portion 54B to radially oppose thereto and having seal surfaces making sliding contact with each other, and a pair of O-rings 55C and 55D. The O-rings 55C and 55D are provided to be sandwiched respectively between the seal rings 55A and 55B, and the hub-side O-ring receiving portion 51B and the retainer-side O-ring receiving portion 54B. Therefore, the O-ring 55C seals a boundary between the seal ring 55A and the hub-side O-ring receiving portion 51B, and the O-ring 55D seals a boundary between the retainer-side O-ring receiving portion 54B and the seal ring 55B. Further, each of the O-rings 55C and 55D applies an axial pressing force to the seal rings 55A and 55B and also seals a boundary between the seal rings 55A and 55B.

Denoted at 56 is the other retainer mounted to an end opening side of the spindle 14 through a plurality of bolts 57. As shown in FIG. 3, the retainer 56 is fixed to the circular cylindrical portion 14B of the spindle 14 and axially positions the inner race of the wheel support bearing 21 with the outer peripheral side of the circular cylindrical portion 14B. That is, in the wheel support bearing 21, the outer race is axially positioned by the hollow cylindrical portion 18A of the wheel mounting cylinder 18 and the inner race is axially positioned by the retainer 56.

Further, designated at 58 is the foreign-object trapping portion which is a main part in the first embodiment. The foreign-object trapping portion 58 is constituted by the hub-side O-ring receiving portion 51B of the brake hub 51 and the cylindrical projecting portion 54C of the retainer 54 opposing the hub-side O-ring receiving portion 51B having the radial gap R (dimension R shown in FIG. 5) therebetween. Here, the foreign-object trapping portion 58 is communicated with the axial gap T and traps foreign objects to be described later between the opposing surface portion 54D of the cylindrical projecting portion 54C and the hub-side O-ring receiving portion 51B.

In this case, the foreign-object trapping portion 58 is constituted by including the radial opposing surface portion 54D formed on the inner peripheral side of the cylindrical projecting portion 54C, wherein the radial gap R to the hub-side O-ring receiving portion 51B is smaller than the axial gap T (R<T). Thereby the foreign-object trapping portion 58 can trap foreign objects to be described later between the opposing surface portion 54D and the hub-side O-ring receiving portion 51B to prevent the foreign objects from reaching to positions of the wheel support bearings 20 and 21 and the reduction gear mechanism 24 provided between the spindle 14 and the wheel mounting cylinder 18.

The travel drive device 11 for the dump truck 1 according to the first embodiment has the aforementioned configuration, and next, an operation thereof will be explained.

When an operator who gets in the cab 5 of the dump truck 1 activates the engine 8, the hydraulic pump as a hydraulic source is driven and rotated, and electric power is generated by a power generator (any thereof is not shown). At the time the dump truck 1 is driven to travel, the electric power is supplied from the power generator to the wheel drive motor 16, and thereby the wheel drive motor 16 is activated to rotate the rotational shaft 17.

The rotation of the rotational shaft 17 is transmitted from the sun gear 26 of the first-stage planetary gear reduction mechanism 25 to the respective planetary gears 28 in a state of being decelerated, and the rotation of each planetary gear 28 is transmitted through the internal gear 27 and the coupling 32 to the sun gear 34 of the second-stage planetary gear reduction mechanism 33 in a state of being decelerated. In the second-stage planetary gear reduction mechanism 33, the rotation of the sun gear 34 is transmitted to the respective planetary gears 36 in a state of being decelerated. At this time, in the carrier 38 supporting the respective planetary gears 36, the cylindrical projecting section 38A is spline-coupled to the circular cylindrical portion 14B of the spindle 14, and therefore the revolving movements of the respective planetary gears 36 (rotation of the carrier 38) are restrained.

As a result, each of the planetary gears 36 only rotates around the sun gear 34, and rotation decelerated by the rotation of each of the planetary gears 36 is transmitted to the internal gear 35 fixed to the wheel mounting cylinder 18. Thereby, the wheel mounting cylinder 18 rotates with the rotational torque of large output decelerated at the two-stage through the first and second-stage planetary gear reduction mechanisms 25 and 33. In consequence, the left and right rear wheels 7 as the drive wheel can be rotated together with the wheel mounting cylinder 18 to drive the dump truck 1 for traveling.

At the operation of the travel drive device 11, the lubricant oil 100 reserved in the wheel mounting cylinder 18 is stirred upwards in order by rotation of the wheel mounting cylinder 18, the respective planetary gears 28 and 36 in the first and second-stage planetary gear reduction mechanisms 25 and 33, and the like. Therefore, the lubricant oil 100 is supplied to meshing sections of the respective gears, the wheel support bearings 20 and 21 between the circular cylindrical portion 14B of the spindle 14 and the wheel mounting cylinder 18, and the like. Thereafter, the lubricant oil 100 flows downwards and is reserved in the bottom side of the wheel mounting cylinder 18.

The lubricant oil 100 accommodated in the bottom side of the wheel mounting cylinder 18 is suctioned up from the tip end side 40A of the suction pipe 40 by the lubricating pump. The lubricant oil 100 is cooled by an oil cooler or the like, and subsequently, is discharged to the side of the supply pipe 41. Therefore, the lubricant oil 100 can be sequentially supplied from the tip end side 41A of the supply pipe 41 toward the reduction gear mechanism 24 (that is, the first and second-stage planetary gear reduction mechanisms 25 and 33) in the wheel mounting cylinder 18.

In a case of decelerating a traveling speed of the dump truck 1 in the middle of the traveling, in some cases the dump truck 1 can not be sufficiently decelerated simply by decelerating rotation of the wheel drive motor 16. In such a case, an operator of the dump truck 1 depresses the brake pedal to supply a brake pressure (pressurized oil) to the wet brake 45 of a wet multi-plate type, thus driving the brake movable body 47 against the urging spring. Thereby, the brake movable body 47 presses the respective non-rotating discs 49 in such a manner as to sandwich the respective rotating discs 48 from both sides and can apply braking forces to the brake hub 51 rotating integrally with the wheel mounting cylinder 18. As a result, the rotation of the rear wheel 7 is decelerated together with the wheel mounting cylinder 18, and the dump truck 1 can obtain a desired deceleration effect.

The wet brake 45 of the wet multi-plate type is configured, for cooling frictional heat of the respective rotating discs 48 and the respective non-rotating discs 49 generated at braking, such that components including the discs 48 and 49 are immersed in the cooling liquid 50. The cooling liquid 50 is an oil liquid different kind from the lubricant oil 100 in the wheel mounting cylinder 18, and therefore it is required to prevent contamination of both the liquids. That is, for keeping both the liquids in a completely separated state, the floating seal 55 as a seal mechanism is provided between the retainer 54 in the side of the spindle 14 and the brake hub 51 in the side of the wheel mounting cylinder 18.

Incidentally, there are some cases where a large-sized transporter vehicle such as the dump truck 1 performs a repetitive operation of the wet brake 45 for sufficiently decelerating the dump truck 1 in the middle of traveling on a long down-slope, for example. That is, when a braking operation of applying a braking force by operating the wet brake 45 or releasing the braking force is repeated several times, a heat generated amount of the wet brake 45 increases to exceed a capability of the cooling liquid 50, possibly causing overheating. Further, in a case where the wet brake 45 becomes high in temperature, components of the wet brake 45 are possibly broken or damaged. Further, the seal rings 55A and 55B in the floating seal 55 are possibly broken or damaged due to generation of seizing, wear or the like on sliding surfaces therebetween under such a high-temperature condition. In addition, the O-rings 55C and 55D of the floating seal 55 are also possibly broken or damaged under an influence of a high temperature or a pressure from the wet brake 45.

In such a case, there is a possibility that not only a sealing function of the floating seal 55 is lost, but also broken pieces due to breakage and damage of the components from the wet brake 45 and the floating seal 55 are generated as foreign objects. These foreign objects possibly enter into an inside of the wheel mounting cylinder 18 and reach to positions of the wheel support bearings 20 and 21 and the reduction gear mechanism 24 provided between the spindle 14 and the wheel mounting cylinder 18. When the component in the reduction gear mechanism 24 is damaged by the foreign object, in the worst case, the dump truck 1 is difficult to drive and travel on its own. Particularly, since the dump truck 1 as a large-sized transporter vehicle is difficult to be trailed by another vehicle, which is different from a general passenger car, it is desirable that the dump truck 1 can travel to a safe place on its own in the meantime.

Therefore, according to the first embodiment, the retainer 54 is provided on the outer peripheral side of the spindle 14 for positioning the inner race of the wheel support bearing 20, and the foreign-object trapping portion 58 is provided between the retainer 54 and the brake hub 51. The foreign-object trapping portion 58 is structured in such a manner as to prevent foreign objects from flowing from the wet brake 45 to the wheel support bearing 20 when the components (for example, the seal rings 55A and 55B, and the O-rings 55C and 55D) in the floating seal 55 are damaged.

In this case, the retainer 54 is provided with the sealing arm portion 54A obliquely extending in a radial outside toward the hub-side O-ring receiving portion 51B of the brake hub 51, the retainer-side O-ring receiving portion 54B formed integrally with a tip end side of the sealing arm portion 54A and opposing the hub-side O-ring receiving portion 51B with an axial gap T therebetween, the cylindrical projecting portion 54C formed in a position which is a radial outside of the retainer-side O-ring receiving portion 54B to be curved in an L-letter shape and axially projecting to surround the hub-side O-ring receiving portion 51B from a radial outside, and the radial opposing surface portion 54D formed on the inner peripheral side of the cylindrical projecting portion 54C.

Further, the foreign-object trapping portion 58 is constituted by including the cylindrical projecting portion 54C and the opposing surface portion 54D in the retainer 54, and the opposing surface portion 54D is structured such that the radial gap R opposing the hub-side O-ring receiving portion 51B of the brake hub 51 is made as small as possible. That is, the radial gap R between the opposing surface portion 54D and the hub-side O-ring receiving portion 51B of the brake hub 51 is smaller than the axial gap T between the hub-side O-ring receiving portion 51B and the retainer-side O-ring receiving portion 54B (R<T).

Therefore, in a case where the floating seal 55 is damaged or broken under an influence of the high temperature or the pressure under such a high-temperature condition that the component of the wet brake 45 is broken or damaged, the foreign-object trapping portion 58 can trap these broken pieces as foreign objects. Therefore, even if the axial gap T is communicated with the radial gap R, the foreign-object trapping portion 58 can prevent the foreign object from flowing from the wet brake 45 to the wheel support bearing 20 side. That is, the foreign-object trapping portion 58 can trap the foreign object to prevent the foreign object from reaching to the positions of the wheel support bearings 20 and 21 and the reduction gear mechanism 24 which are provided between the spindle 14 and the wheel mounting cylinder 18.

In this manner, according to the first embodiment, the foreign-object trapping portion 58 is provided in a position between the wheel support bearing 20 and the floating seal 55. Thereby, the components of the reduction gear mechanism 24 can be protected from the foreign object also at the damages of the wet brake 45, the floating seal 55 and the like.

Further, the foreign-object trapping portion 58 is provided with the radial gap R between the section curved in an L-letter shape in the radial direction from the axial gap T in the retainer 54, namely, the opposing surface portion 54D of the cylindrical projecting portion 54C and the hub-side O-ring receiving portion 51B of the brake hub 51. Therefore, even in a case where the foreign objects pass through the axial gap T between the brake hub 51 and the retainer 54, the foreign objects can be trapped by the foreign-object trapping portion 58 formed in the section curved in an L-letter shape, preventing these foreign objects from flowing to the downstream side.

Figure 6:
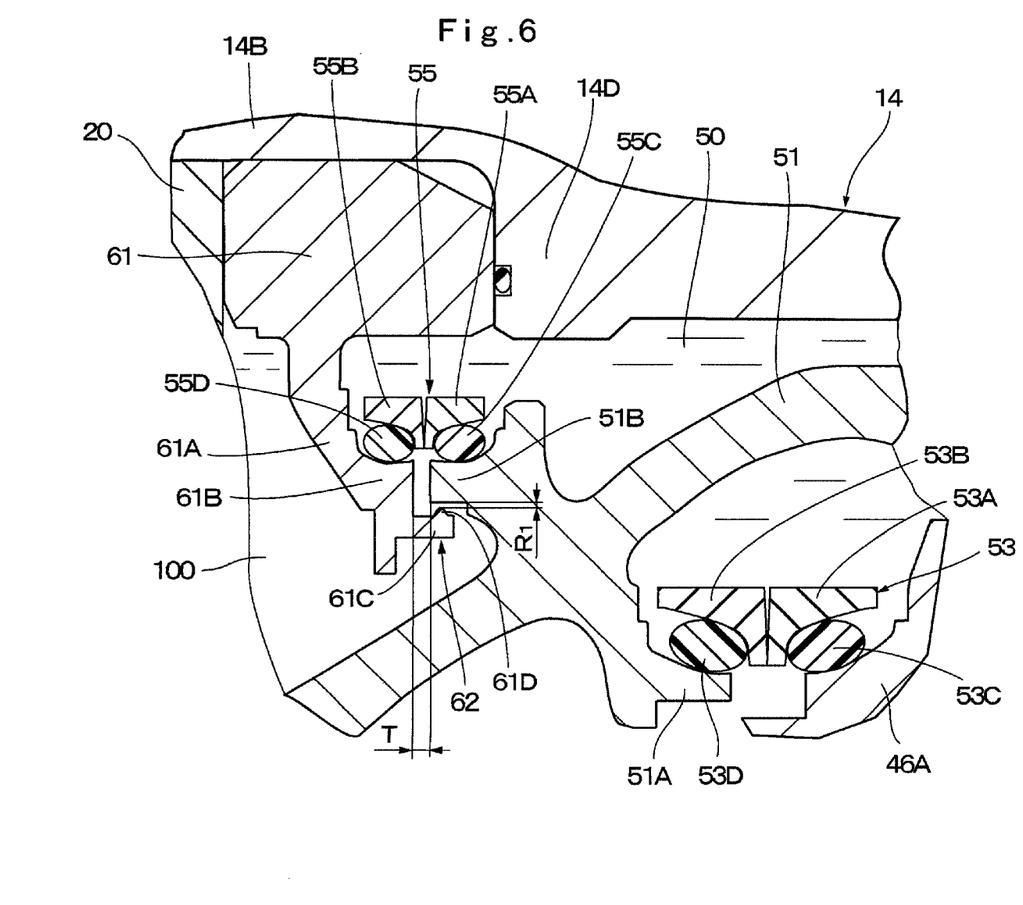
FIG. 6 is an enlarged cross-sectional view showing a brake hub, a retainer, a floating seal and the like according to a second embodiment.

Next, FIG. 6 shows a second embodiment of the present invention. The present embodiment comprises an annular thickened portion provided on an inner peripheral side of a cylindrical projecting portion in a retainer, wherein the annular thickened portion forms a foreign-object trapping portion. It should be noted that, in the second embodiment, the component elements that are identical to those of the foregoing first embodiment will be simply denoted by the same reference numerals to avoid repetitions of similar explanations.

In the figure, denoted at 61 is the retainer adopted in the second embodiment, and the retainer 61 is configured to be substantially similar to the retainer 54 described in the first embodiment and comprises a sealing arm portion 61A, a retainer-side O-ring receiving portion 61B, and a cylindrical projecting portion 61C. However, the present embodiment is different from the first embodiment in a point where in the retainer 61 of this case, a radial opposing surface portion formed on the inner peripheral side of the cylindrical projecting portion 61C is formed as the annular thickened portion 61D.

Here, the annular thickened portion 61D is formed by providing a thickened part having an arc shape or a triangular shape in section on the inner peripheral side of the cylindrical projecting portion 61C radially opposing the hub-side O-ring receiving portion 51B of the brake hub 51. The annular thickened portion 61D extends over an entire periphery on the inner peripheral side of the cylindrical projecting portion 61C. Thereby, the annular thickened portion 61D is configured to make a radial gap R1 (dimension R1 shown in FIG. 6) to the hub-side O-ring receiving portion 51B of the brake hub 51 as small as possible. The radial gap R1 between the hub-side O-ring receiving portion 51B of the brake hub 51 and the annular thickened portion 61D is formed to be smaller dimension than the axial gap T between the hub-side O-ring receiving portion 51B and the retainer-side O-ring receiving portion 54B (R1<T).

Denoted at 62 is a foreign-object trapping portion adopted in the second embodiment, and the foreign-object trapping portion 62 is constituted by including the hub-side O-ring receiving portion 51B of the brake hub 51, the cylindrical projecting portion 61C of the retainer 61, and the annular thickened portion 61D, and traps foreign objects between the hub-side O-ring receiving portion 51B of the brake hub 51 and the annular thickened portion 61D.

In this manner, also in the thus configured second embodiment, the cylindrical projecting portion 61C of the retainer 61 and the annular thickened portion 61D can form the foreign-object trapping portion 62 for trapping foreign objects between the hub-side O-ring receiving portion 51B of the brake hub 51 and the annular thickened portion 61D. Therefore, the second embodiment can obtain substantially the same functions and effects as in the first embodiment.

Particularly in the second embodiment, the annular thickened portion 61D of the foreign-object trapping portion 62 is formed by providing the thickened part having an arc shape or a triangular shape in section on the inner peripheral side of the cylindrical projecting portion 61C. Therefore, the process of making the radial gap R1 between the hub-side O-ring receiving portion 51B of the brake hub 51 and the annular thickened portion 61D as small as possible can be relatively easily executed to improve the function of the foreign-object trapping portion 62 with a simple process.

It should be noted that, each of the aforementioned embodiments, is explained by taking a case where the reduction gear mechanism 24 is constituted by the second-stage planetary gear reduction mechanisms 25 and 33, as an example. However, the present invention is not limited to the same, and for example, the reduction gear mechanism may be constituted by a first, third or more-stage planetary gear reduction mechanisms.

Each of the aforementioned embodiments is explained by taking the dump truck 1 of a rear-wheel drive type as an example. However, the present invention is not limited to the same, and it may be applied to, for example, a dump truck of a front-wheel drive type or a four-wheel drive type driving front and rear wheels together.

Description Of Reference Numerals

1: Dump truck
    2: Vehicle body
    3: Vessel
    5: Cab
    6: Front wheel
    7: Rear wheel (Wheel)
    8: Engine
    9: Hoist cylinder
    10: Operating oil tank
    11: Travel drive device
    12: Axle housing
    13: Suspension tube
    14: Spindle
    16: Wheel drive motor (Drive source)
    17: Rotational shaft
    18: Wheel mounting cylinder
    20, 21: Wheel support bearing
    22: Outer drum
    23: Long bolt
    24: Reduction gear mechanism
    25, 33: Planetary gear reduction mechanism
    40: Suction pipe
    41: Supply pipe
    45: Wet brake
    50: Cooling liquid
    51: Brake hub
    51B: Hub-side O-ring receiving portion for sealing
    53: Floating seal for leakage prevention
    54, 61: Retainer
    54B, 61B: Retainer-side O-ring receiving portion
    54C, 61C: Cylindrical projecting portion
    54D: Radial opposing surface portion
    55: Floating seal for liquid separation (Seal mechanism)
    56: Other retainer
    58, 62: Foreign-object trapping portion
    61D: Annular thickened portion (Radial opposing surface portion)
    100: Lubricant oil
    R, R1: Radial gap
    T: Axial gap

What is claimed is:

1. A travel drive device for a dump truck comprising:
    a cylindrical axle housing mounted in a non-rotating state on a vehicle body of a dump truck;
    a rotational shaft provided to axially extend in said axle housing and driven and rotated by a drive source;
    a wheel mounting cylinder which is rotatably provided on an outer peripheral side of said axle housing through a plurality of wheel support bearings and to which wheels are mounted;
    a reduction gear mechanism provided between said axle housing and said wheel mounting cylinder to decelerate rotation of said rotational shaft, which is transmitted to said wheel mounting cylinder;
    a wet brake provided between said axle housing and said wheel mounting cylinder for applying a braking force to rotation of said wheel mounting cylinder; and
    a seal mechanism positioned between said wet brake and one of the plurality of said wheel support bearings and provided between said axle housing and said wheel mounting cylinder for keeping a cooling liquid of said wet brake in a sealed state to a lubricant oil in said wheel mounting cylinder, and a foreign-object trapping portion is-provided between said one wheel support bearing and said seal mechanism for trapping foreign objects flowing from said seal mechanism toward said one wheel support bearing, wherein said foreign-object trapping portion is configured as a radial gap formed of a gap providing a radial space between a brake hub forming part of the said wet brake and a retainer positioning an inner race of said one wheel support bearing to said axle housing.

2. A travel drive device for a dump truck according to claim 1, wherein said brake hub is provided in said wheel mounting cylinder to transmit a braking force of said wet brake to said wheel mounting cylinder, said retainer is provided between said axle housing and an inner race of said one wheel support bearing and opposes said brake hub through an axial gap to be axially spaced therefrom, and the radial gap forming said foreign-object trapping portion is formed to be radially spaced between said brake hub and said retainer in a state of being communicated with said axial gap, and is smaller than said axial gap.

3. A travel drive device for a dump truck according to claim 1, wherein said brake hub is provided in said wheel mounting cylinder to transmit a braking force of said wet brake to said wheel mounting cylinder, said retainer is provided between said axle housing and an inner race of said one wheel support bearing and opposes said brake hub through an axial gap to be axially spaced therefrom, said seal mechanism comprises a floating seal including a pair of seal rings and a pair of O-rings to seal said axial gap between the brake hub and said retainers, said brake hub is provided with a hub-side O-ring receiving portion axially extending toward said retainer to receive one O-ring in said floating seal, said retainer is provided with a retainer-side O-ring receiving portion axially opposing said hub-side O-ring receiving portion through said axial gap to receive the other O-ring in said floating seal, and a cylindrical projecting portion formed to axially extend outward from said retainer-side O-ring receiving portion and radially oppose said hub-side O-ring receiving portion, and the radial gap forming said foreign-object trapping portion is formed to be radially spaced between said hub-side O-ring receiving portion and said cylindrical projecting portion in a state of being communicated with said axial gap and is smaller than said axial gap.

4. A travel drive device for a dump truck according to claim 1, wherein said retainer is provided with an annular thickened portion on a surface radially opposing said brake hub, wherein said radial gap is formed by said annular thickened portion.

* * * * *